Dec. 30, 1969    D. M. TENNISWOOD    3,486,337
DUAL MASTER CYLINDER

Filed Oct. 17, 1967    2 Sheets-Sheet 1

INVENTOR
DAVID M. TENNISWOOD
BY John R. Faulkner
Clifford L. Sadler
ATTORNEYS

Dec. 30, 1969  D. M. TENNISWOOD  3,486,337
DUAL MASTER CYLINDER

Filed Oct. 17, 1967  2 Sheets-Sheet 2

INVENTOR
DAVID M. TENNISWOOD
BY John R. Faulkner
Clifford L. Sadler
ATTORNEYS 3,486,337
DUAL MASTER CYLINDER
David M. Tenniswood, Detroit, Mich., assignor to Ford Motor Company, Dearborn, Mich., a corporation of Delaware
Filed Oct. 17, 1967, Ser. No. 675,937
Int. Cl. F15b 7/00; B60t 11/10
U.S. Cl. 60—54.6                     11 Claims

ABSTRACT OF THE DISCLOSURE

A dual master cylinder for a split hydraulic braking system having a balancing means to substantially equalize the hydraulic pressures in the primary and the secondary chambers. In the event of a hydraulic failure in part of the split system, there is no overall increase in the displacement volume requirements of the remaining part of the system.

BACKGROUND OF THE INVENTION

In an automotive hydraulic braking system utilizing a conventional single piston master cylinder, a break or leak anywhere in the system may result in the complete loss of braking ability. A known method of preventing such a loss of braking ability is to use a master cylinder having two pressure chambers and operating part of the individual wheel cylinders from one of the chambers and the other wheel cylinders from the second chamber.

The use of such a split system with a dual master cylinder gives rise to design complications not experienced with single pressure chamber systems. A method to effect substantially simultaneous actuation of the various wheel cylinders in any brake system is considered desirable. Because maximum braking is generally achieved with greater displacement to the front wheel cylinders than to the rear wheel cylinders, a means to apportion displacement between the front and rear wheel brakes is also desirable. Finally, in a split system, it is desirable to have a construction that satisfactorily performs these operations without an overall loss of displacement or increase in pedal travel in the event that a hydraulic failure occurs in one of the wheel cylinder lines.

Prior art is replete with dual master cylinder devices that perform some, but not all, of the aforementioned functions or that utilize a construction which is intricate and not capable of economical mass production or continued reliable operation. It is, therefore, an object of this invention to provide an economical and reliable dual master cylinder construction for a split hydraulic braking system that has a balancing means between the split system pressure chambers to effect substantially simultaneous actuation of the individual wheel cylinders, that has an apportioning means to provide a greater displacement to one part of the split system than to the other part, and which experiences no overall displacement loss or pedal travel increase upon a hydraulic line failure.

BRIEF SUMMARY OF THE INVENTION

A dual master cylinder constructed in accordance with this invention includes a first compression chamber and a second compression chamber. The first chamber is defined in part by a cylinder bore and a piston slidably received in the cylinder bore. A second bore and a second piston slidably received therein define in part the second compression chamber. A shuttle means separates the first and the second compression chambers and is axially movable within the first bore. A spring separates the shuttle and the second piston and biases them toward maximum axial separation. The second piston and shuttle means are axially movable relative to each other and to the first piston to substantially balance the pressures in the first and second chambers upon brake application.

BRIEF DESCRIPTION OF THE DRAWINGS

FIGURE 1 also shows schematically the brake lines and wheel cylinders;

DETAILED DESCRIPTION OF THE INVENTION

Figure 1:
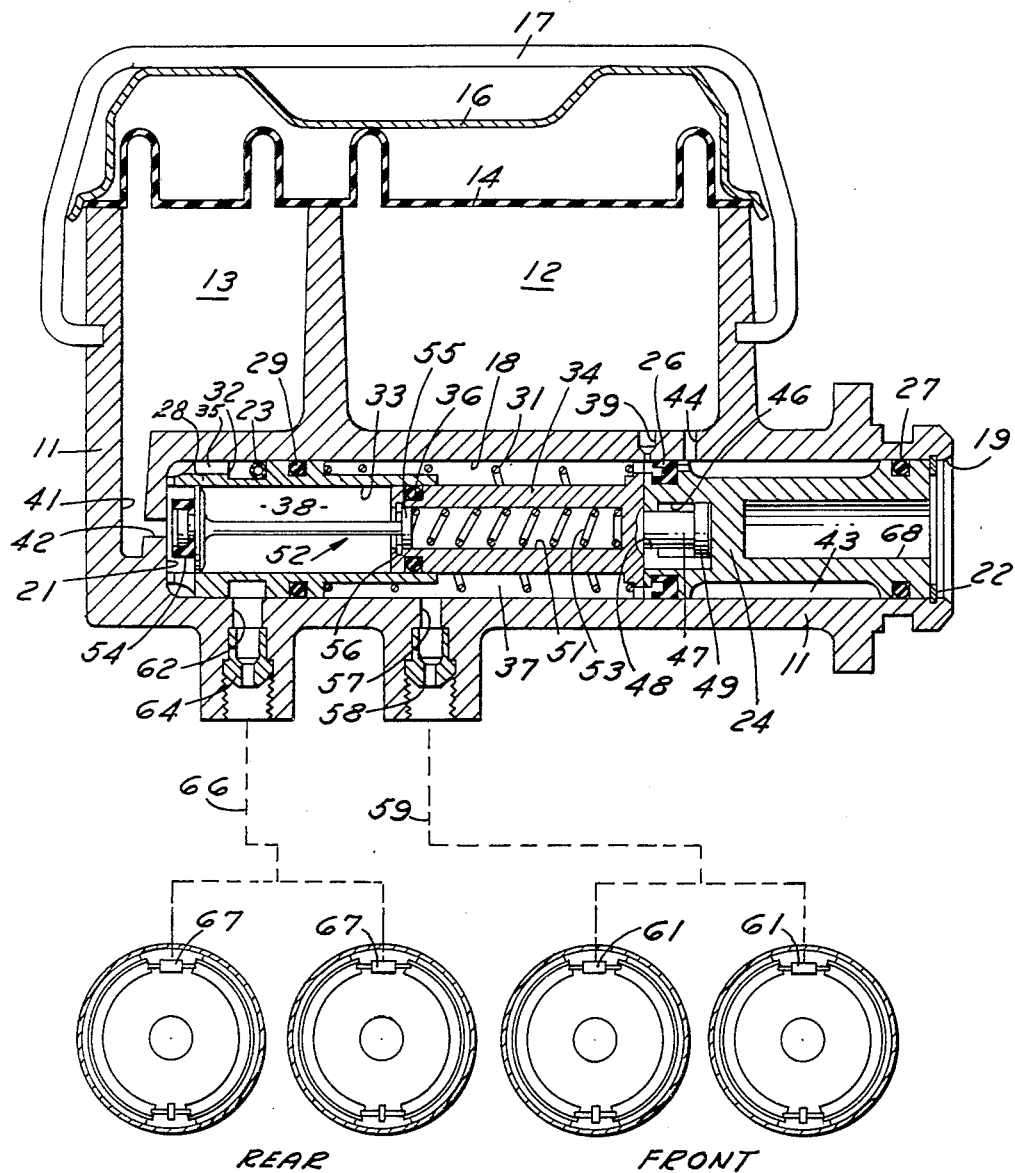
FIGURE 1 is an elevational view in section of a dual master cylinder which incorporates a preferred embodiment of the invention showing the positions of elements at a time when the vehicle brakes are not applied.

Referring now to the drawings for a more complete understanding of the present invention, FIGURE 1 discloses a dual master cylinder for a split hydraulic brake system. The dual master cylinder of FIGURE 1 comprises a housing 11 having an upper portion that is divided into front and rear reservoir chambers 12 and 13. The open upper ends of the reservoir chambers 12 and 13 are sealed by a flexible rubber diaphragm 14 that has a plurality of corrugations to enhance its flexibility. A cover or lid 16 is positioned over the diaphragm 14 and is sealed along the edges of the reservoirs 12 and 13 by a retainer 17 that holds the perimeter of the cover 16 against diaphragm 14 at the upper end of master cylinder housing 11.

Cylindrical bore 18 extends horizontally within housing 11, starting at the opening 19 and ending at bore end 21. A snap ring 22 is positioned in a groove in bore 18 near opening 19 and acts as a return abutment for piston 24.

Piston 24, positioned adjacent opening 19, slidably engages the wall of bore 18 at high pressure seal 26 and O-ring seal 27. A cylindrically-shaped shuttle 28 slidably engages bore 18 at O-ring seal 29 and is positioned adjacent bore end 21. Compressed coil spring 31, coaxial with bore 18, urges shuttle 28 and piston 24 axially apart toward end 21 and ring 22, respectively.

Shuttle 28 is formed with an annular groove 32 which receives a portion of rolled pin 23 and permits limited axial movement of shuttle 28 in bore 18. Rolled pin 23, perpendicular to the axis of bore 18, forms an abutment within bore 18. Bore 33, coaxial with bore 18, traverses the length of shuttle 28 and slidably receives a portion of a piston 34 at O-ring seal 36.

A primary or front brake compression chamber 37 is defined in part by bore 18, seal 26 of piston 24, piston 34 and shuttle 28. A secondary or rear brake compression chamber 38 is defined in part by bore 33 of shuttle 28 and piston 34.

An axial slot 35 in shuttle 28 permits hydraulic fluid to pass from chamber 38 to groove 32.

Brake fluid enters primary or front brake chamber 37 from reservoir 12 through compensating port 39. Similarly, reservoir 13 communicates with secondary or rear brake chamber 38 through passage 41 and compensating port 42.

An annular recess 43, extending axially along a portion of piston 24, is in constant communication with reservoir 12 via fluid return 44 to permit hydraulic fluid leaking past high pressure seal 26 to return to reservoir 12. Recess 43 and reservoir 12 are at or near atmospheric pressure at all times during brake operation.

Piston 24 has a cylindrical recess 46 in one end that receives a stem portion 47 of piston 34. The recess 46 has a restricted opening 48 which abuts a head 49 on stem portion 47 to prevent complete withdrawal from recess 46. An axially extending slot is formed in recess 46 and opening 48 to permit hydraulic fluid to pass freely about stem portion 47. When the brakes are not activated the pistons 24 and 34 are resiliently urged together to the relative positions shown in FIGURE 1.

Piston 34 is formed with a blind bore 51 which receives a portion of a plunger valve 52. Spring 53, compressed within bore 51, urges plunger valve 52 toward bore end 21 and port 42. Cup-shaped seal 54 of plunger valve 52 is axially held apart from bore end 21 by snap ring 56 when the brakes are not actuated.

Outlet port 57 transmits brake fluid from primary chamber 37 through fitting 58 to the primary or front wheel hydraulic lines 59 and the corresponding wheel cylinders 61 of the front wheel brakes. Similarly, outlet port 62 transmits fluid from secondary chamber 38 through pipe fitting 64 to the secondary or rear wheel hydraulic system lines 66 and their corresponding wheel cylinders 67 of the rear wheel brakes.

A blind bore 68 is formed in the right end of piston 24 to receive the push rod (not shown) of the master cylinder actuating mechanism. The push rod is connected to a brake pedal at one end and inserted in bore 68 at its other end.

Operation

FIGURE 1 illustrates the normal positions of the elements of the dual master cylinder at a time when the vehicle brakes are not applied. Pistons 24 and 34 are held in their respective extreme righthand positions by coil spring 31. Piston 34 is resiliently urged against piston 24 which, in turn, is biased against snap ring 22. Plunger valve 52 is biased leftwardly by spring 53 but is prevented from closing port 42 because of the abutment of cap 55 of valve 52 with snap ring 56 of piston 34. With the elements in the positions described, fluid from reservoir 12 fills chamber 37 and fluid from reservoir 13 fills chamber 38.

The cross sectional areas of bores 18 and 33 are determined according to the volume requirements of the primary and secondary hydraulic systems. It has been found that for maximum braking ability of an automobile, the front wheels should receive a greater amount of displacement than the rear wheels. Assuming that the vehicle design requires 65 percent of the total brake system displacement volume to the front wheels or the primary system and 35 percent to the rear wheels or secondary system, the correct volume displacement would be obtained by proportioning the secondary or rear wheel chamber bore 33 cross sectional area so that it is equal to 35 percent of the cross sectional area of primary or front wheel chamber bore 18.

On initial movement of pistons 24 and 34 during normal braking operation, seal 26 traverses port 39 to seal chamber 37 from reservoir 12. At the same time, the increased pressure in chamber 38 caused by the initially simultaneous leftward movement of piston 34 with piston 24 urges plunger valve 52 and its seal 54 into sealing engagement with bore end 21. Snap ring 56 of piston 34 no longer limits the leftward movement of plunger valve 52 because piston 34 has moved leftwardly relative to bore end 21.

Because of the normal tolerances attendant commercial mass production, it is unlikely that the displacement required to actuate the front wheel brakes will be exactly equal to the displacement of the primary chamber piston 34. Similarly, it is unlikely that the displacement required to actuate the rear wheel brakes will be exactly equal to the displacement of the secondary chamber pistons 24. It is thus desirable to employ a balancing mechanism to make accommodation for manufacturing tolerances by substantially balancing the pressures of the primary chamber 37 and secondary chamber 38 during normal brake application so as to effect essentially simultaneous application of the front and rear brakes. For example, if at the moment the rear brakes were experiencing initial engagement with their friction members the front brakes had not yet reached initial engagement, then piston 34 would move leftwardly a distance sufficient to balance the pressures in chambers 37 and 38 and provide the displacement needed for simultaneous actuation to the front wheel cylinders 61 prior to the major buildup of braking pressures. On the other hand, if at the moment the front brakes were experiencing initial engagement with their friction members the rear brakes had not reached initial engagement, then shuttle 28 would move rightwardly a distance sufficient to balance the pressures in chamber 37 and 38 and provide the displacement needed for simultaneous actuation to the rear wheel cylinders 67.

The fluid pressures in chambers 37 and 38 would not be exactly equal because of additional forces due to springs 31 and 53. However, these spring forces are insignificant in comparison with the hydraulic forces; thus, for practical purposes, the chamber pressures would be balanced.

Because the pressure of chamber 37 is essentially the same as the pressure of chamber 38 during normal braking operations, seals 29 and 36 carry nominal or no pressure differentials. It is only when there is a hydraulic failure in a portion of the system that seals 29 and 36 become high pressure seals. Seal 27 of piston 24 carries reservoir 12 pressure which is at or near atmospheric pressure. It may be seen that seal 26 of piston 24 is the only high pressure sliding seal during normal operations. This reduction in the member of high pressure sliding seals reduces the cost and increases the reliability of the embodiment as compared with prior art devices requiring a plurality of such seals.

Figure 2:
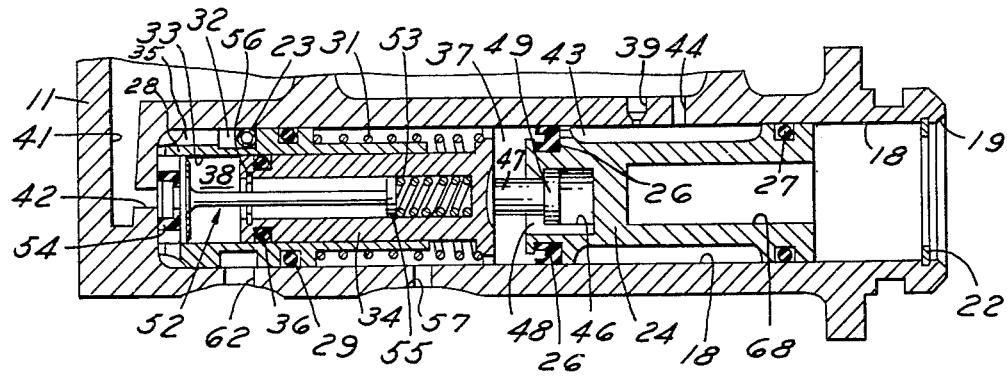
FIGURE 2 is a sectional view of a portion of the master cylinder of FIGURE 1 showing the positions of the elements during a failure in the secondary or rear portion of the split system upon brake application.

Should a hydraulic failure occur in the secondary or rear wheel portion of the split system during braking of the vehicle, the pressure in front or primary chamber 37 would force piston 34 leftwardly relative to piston 24 until head 49 abutted stop portion 48 as shown in FIGURE 2. The leftward movement of piston 34 results in an initial loss of displacement to the front portion of the brake system, but the loss is regained at a later portion of the strokes of pistons 24 and 34. As pistons 24 and 34 continue to move leftwardly, piston 34 abuts shuttle 28 which is in its extreme leftwardly position against pin 23. At this point piston 34 will stop its leftward movement relative to bores 18 and 33 as piston 24 continues to move leftwardly relative to piston 34 until at full stroke the pistons have moved together once again. It may be seen that there is no overall loss of displacement to the front portion of the brake system upon a hydraulic failure in the rear portion.

Figure 3:
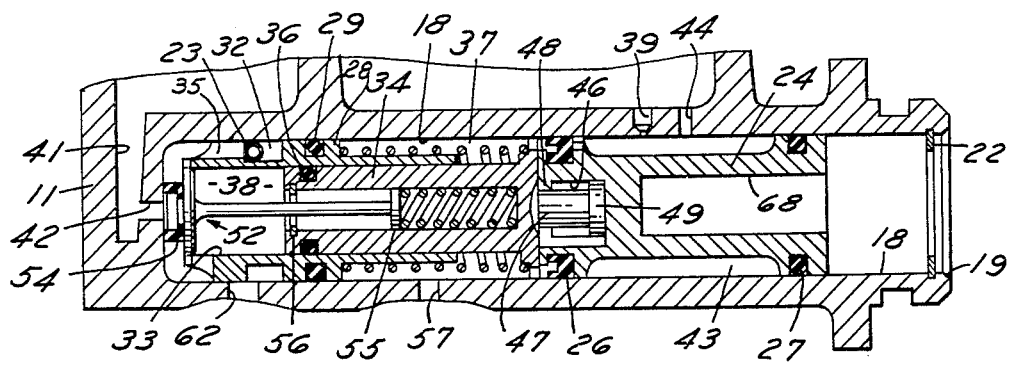
FIGURE 3 is a sectional view of a portion of the master cylinder of FIGURE 1 showing the positions of the elements during a failure in the primary or front portion of the split system upon brake application.

Should a hydraulic failure occur in the primary or front wheel portion of the split brake system during braking of the vehicle, the pressure in the rear or secondary chamber 38 would force shuttle 28 rightwardly until the left side of slot 32 engages rolled pin 23 as shown in FIGURE 3. The rightward movement of shuttle 28 results in an initial displacement loss to the rear portion of the brake system, but the loss is regained as the pistons 24 and 34 continue to move leftwardly. Prior to full stroke, piston 34 engages shuttle 28 and carries it leftwardly until at full stroke the right side of slot 32 once again bears against pin 23. It may thus be seen that there is no overall loss of displacement to the front portion of the split brake system upon a hydraulic failure in the rear portion of the system.

In summary, it may be seen that this invention provides a dual master cylinder for a split brake system having a pressure balancing mechanism between the two chambers and which apportions the total displacement between the front portion and the rear portion of the split system. Unlike prior art devices performing apportioning and balancing functions, with this invention there is no overall loss of displacement in the operative portion of the brake system and no resulting overall increase in brake pedal travel occurring upon a failure in one portion of the split system.

The foregoing description presents the presently preferred embodiment of the invention. Modifications and alterations will occur to those skilled in the art that are included within the scope and spirit of the following claims.

I claim:
1. A master cylinder having a first cylindrical bore, first piston means slidably received in said first bore, shuttle means slidably received in said first bore coaxial therewith,
a second bore coaxial with said first bore,
second piston means slidably received in said second bore,
a first compression chamber defined in part by said first bore, said first piston means, said second piston means and said shuttle means,
a second compression chamber defined in part by said second bore, said second piston means and said shuttle means,
said second piston means and said shuttle means each being axially movable relative to said first piston means in response to a pressure differential between said first and said second chambers during brake application.

2. A master cylinder according to claim 1 including:
connecting means between said first piston means and second piston means permitting limited axial movement of said second piston means relative to said first piston means.

3. A dual master cylinder having
a first cylindrical bore having a constant diameter cross section,
piston means and shuttle means coaxial with said first bore slidably received in said first bore,
said shuttle means formed with an axially extending cylindrical bore slidably receiving a portion of said piston means,
said first bore, piston means and shuttle means defining a first compression chamber and a second compression chamber,
one axial side of said shuttle means defining in part said first compression chamber, the other axial side of said shuttle means defining in part said second compression chamber,
said shuttle means separating said first chamber and said second chamber and being axially movable in response to a pressure differential between said chambers during a stroke of said piston means.

4. A dual master cylinder having
a first cylindrical bore,
first piston means and shuttle means slidably received in said first bore,
said first bore, first piston means and shuttle means defining in part a first compression chamber,
said shuttle means formed with an axially extending cylindrical bore,
second piston means slidably received in said shuttle bore,
said shuttle and second piston means defining in part a second compression chamber,
said shuttle means separating said first chamber and said second chamber,
said second piston means and said shuttle means each being axially movable relative to said first piston means to substantially equalize pressures in said first and said second chambers during progressive brake application.

5. A master cylinder according to claim 4 including:
connecting means between said first piston means and said second piston means permitting limited axial movement of said second piston means relative to said first piston means.

6. A master cylinder according to claim 4 including:
one of said piston means formed with an axially extending stem portion,
an axially extending recess in the other of said piston means receiving said stem portion and permitting limited axial movement of said stem portion within said recess.

7. A master cylinder according to claim 4 including:
one of said piston means having an axially extending stem portion,
the other of said piston means having an axially extending recess receiving said stem portion,
abutments means in said recess permitting limited axial movement of said stem portion in said recess and preventing total withdrawal of said stem portion from said recess,
abutment means in said first bore permitting limited axial movement of said shuttle means,
spring means biasing said shuttle means and second piston means at all times toward maximum axial separation.

8. A master cylinder according to claim 4 including:
one of said compression chambers defined in part by a bore end portion having an orifice,
a fluid reservoir,
said orifice communicating with said reservoir,
a valve means adjacent said orifice closing said orifice upon activation of said first piston.

9. A master cylinder according to claim 4 including:
said shuttle means being cylindrical in shape,
said second piston means having abutment means engageable with said shuttle means to permit said second piston means and said shuttle means to move simultaneously during a portion of the stroke of said second piston means.

10. A dual master cylinder according to claim 4 and including:
said first and second piston means axially movable within their respective bores to increase and decrease the volumes of said chambers,
one of said pistons having an axially extending stem portion,
said stem portion including a shank portion and a head portion,
the other of said piston means having a axially extending recess receiving said stem portion,
said recess having a restricted opening which abuts said head portion and prevents complete withdrawal of said stem portion from said recess thereby limiting the movement of said second piston axially away from said first piston upon loss of hydraulic pressure in said second chamber.

11. A dual master cylinder according to claim 6 including:
an end portion of said second piston and the adjacent end portion of said first piston being mutually engageable,
said second piston end portion resiliently biased against said first piston end portion when the vehicle brakes are not applied,
said first and second pistons moving simultaneously within said bore upon initial brake application,
said first and second pistons continuing to move simultaneously during progressive brake application in the event of a pressure loss in said first chamber.

References Cited

UNITED STATES PATENTS

| 2,074,416 | 3/1937 | Oliver. |
| 3,151,459 | 10/1964 | Brukner. |
| 3,415,060 | 12/1968 | Belart et al. |

MARTIN P. SCHWADRON, Primary Examiner

R. R. BUNEVICH, Assistant Examiner

U.S. Cl. X.R.

188—152